(12) United States Patent
Gurantz

(10) Patent No.: US 8,719,890 B2
(45) Date of Patent: May 6, 2014

(54) VARIABLE MODULATION UNICAST SYSTEM

(75) Inventor: Itzhak Gurantz, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 306 days.

(21) Appl. No.: 13/099,205

(22) Filed: May 2, 2011

(65) Prior Publication Data

US 2011/0209186 A1    Aug. 25, 2011

Related U.S. Application Data

(62) Division of application No. 10/925,365, filed on Aug. 23, 2004, now Pat. No. 7,937,738.

(51) Int. Cl.
*H04N 7/173*      (2011.01)
(52) U.S. Cl.
USPC ............. 725/118; 725/98; 725/109; 725/111; 725/126

(58) Field of Classification Search
USPC ............................ 725/118, 98, 109, 111, 126
See application file for complete search history.

(56) References Cited

U.S. PATENT DOCUMENTS

| 7,085,306 B1* | 8/2006 | Voldman et al. ............... 375/132 |
| 2003/0125040 A1* | 7/2003 | Walton et al. .................. 455/454 |
| 2005/0100050 A1* | 5/2005 | Huang et al. ................... 370/476 |

* cited by examiner

*Primary Examiner* — Mulugeta Mengesha
(74) *Attorney, Agent, or Firm* — Bruce Greenhaus

(57) ABSTRACT

A system is described that consists of a variable modulation unicast system that utilizes multiple modulation schemes in a cable network for unicast applications and is capable of assigning users to different channels of differing modulation schemes in the network based on a feedback signal received in response to a transmitted probe signal. The system may also, in response to the feedback signal from a remote device in the network, assign a channel from a plurality of channels having differing carrier frequencies and modulation schemes to the remote device and may also modify the carrier frequencies of the channels.

18 Claims, 8 Drawing Sheets

VARIABLE MODULATION UNICAST SYSTEM

CROSS-REFERENCE TO RELATED APPLICATIONS

This application is a Divisional of and claims benefit to U.S. Non-Provisional Application No. 10/925,365 filed Aug 23, 2004, U.S. Pat. No. 7,937,738 issued May 3, 2011.

BACKGROUND OF THE INVENTION

1. Field of Invention

The invention relates to broadband communication networks and in particular to broadband communication networks utilizing coaxial cable.

2. Related Art

The worldwide utilization of external television ("TV") antennas for receiving broadcast TV signals, and of cable TV and satellite TV is growing at a rapid pace. These television signals from an external TV antenna, cable TV and satellite TV (such as from direct broadcast satellite "DBS" systems) are usually received externally to a building (such as a home or an office) at a point-of-entry ("POE"). There may be multiple TV receivers and/or video monitors within the building and these multiple TV receivers may be in signal communication with the POE via a broadband cable network that may include a plurality of broadband cables and broadband cable splitters. Generally, these broadband cable splitters distribute downstream signals from the POE to various terminals (also known as "nodes") in the building. The nodes may be connected to various types of customer premise equipment ("CPE") such as cable converter boxes, televisions, video monitors, cable modems, cable phones and video game consoles.

Typically, these broadband cable networks are implemented utilizing coaxial cables and coaxial cable splitters, respectively. Additionally, in the case of cable TV or satellite TV, the multiple TV receivers may be in signal communication with the broadband cable network via a plurality of cable converter boxes, also known as set-top boxes ("STBs"), that are connected between the multiple TV receivers and the broadband cable network via a plurality of network nodes.

Typically, a STB connects to a coaxial cable from a network node (such as the wall outlet terminal) to receive cable TV and/or satellite TV signals. Usually, the STB receives the cable TV and/or satellite TV signals from the network node and converts them into tuned TV signals that may be received by the TV receiver and/or video signals that may be received by a video monitor.

In FIG. 1, an example known broadband cable network 100 (also known as a "cable system" and/or "cable wiring") is shown within a building 102 (also known as customer premises or "CP") such as a typical home or office. The broadband cable network 100 may be in signal communication with an optional cable service provider 104, optional broadcast TV station 106, and/or optional DBS satellite 108, via signal path 110; signal path 112, external antenna 114 and signal path 115; and signal path 116, DBS antenna 118 and signal path 119; respectively. The broadband cable network 100 also may be in signal communication with optional CPEs 120, 122 and 124, via signal paths 126, 128 and 130, respectively.

In FIG. 2, another example known broadband cable network is shown within a building (not shown) such as a typical home. The cable network 200 may be in signal communication with a cable provider (not shown), and/or satellite TV dish (not shown), and/or external antenna (not shown) via a signal path 202 such as a main coaxial cable from the building to a cable connection switch (not shown) outside of the building. The cable network 200 may include a POE 204 and main splitter 206, a sub-splitter 208, and STBs A 210, B 212 and C 214.

Within the cable network 200, the POE 204 may be in signal communication with main splitter 206 via signal path 216. The POE 204 may be the connection point from the cable provider, which is, located external to the building of the cable network 200. The POE 204 may be implemented as a coaxial cable connector, transformer and/or filter.

The main splitter 206 may be in signal communication with sub-splitter 208 and STB A 210 via signal paths 218 and 220, respectively. The sub-splitter 208 may be in signal communication with STB B 212 and STB C 214 via signal paths 222 and 224, respectively. The main splitter 206 and sub-splitter 208 may be implemented as coaxial cable splitters. The STBs A 210, B 212 and C 214 may be implemented by numerous well-known STB coaxial units such as cable television set-top boxes and/or satellite television set-top boxes. Typically, the signal paths 202, 216, 218, 220, 222 and 224 may be implemented utilizing coaxial cables.

In an example operation, the cable network 200 would receive CATV, and/or broadcast TV and/or satellite TV signals 226 via signal path 202 at the POE 204. The POE 204 may pass, transform and/or filter the received RF signals to a second RF signal 228 that may be passed to the main splitter 206 via signal path 216. The main splitter 206 may then split the second RF signal 228 into split RF signals 230 and 232. The split RF signal 230 is then passed to the sub-splitter 208 and the split RF signal 232 is passed to the STB A 210 via signal paths 218 and 220, respectively. Once the split RF signal 232 is received by the STB A 210, the STB A 210 may convert the received split RF signal 232 into a baseband or RF signal 238 that may be passed to a video monitor or a TV set (not shown) in signal communication with the STB A 210.

Once the split RF signal 230 is received by the sub-splitter 208, the sub-splitter 208 splits the received split RF signal 230 into sub-split RF signal 234 and 236 that are passed to STB B 212 and STB C 214 via signal paths 222 and 224, respectively. Once the sub-split RF signals 234 and 236 are received by the STB B 212 and STB C 214, the STB B 212 and STB C 214 may convert the received sub-split RF signals 234 and 236 into baseband or RF signals 240 and 242, respectively, that may be passed to video monitors or TV sets (not shown) in signal communication with STB B 212 and STB C 214, respectively.

Unfortunately, the cable network 200 may introduce significant losses from the POE 204 to STB A 210, STB B 212 and STB C 214 based on the quality of the splitters and coaxial cables. These losses may result in degraded signal levels at STB A 210, STB B 212 and STB C 214. In the past, while utilizing analog transmission schemes, these degraded signal levels usually resulted in some loss in reception quality at STBs as evidenced by such anomalies as ghost and noisy images on some attached video monitors or TV sets.

Unfortunately, these problems have become more important as many cable television providers transition from analog to digital transmissions. Unlike analog transmissions, digital transmissions do not gradually degrade with the transmission channel path performance. Typically, digital transmissions operate in an all or nothing fashion because if the performance of the transmission channel supports the digital transmission, the digital transmission is transmitted through the channel with sufficient quality that results in no visual degradation. Alternatively, if the performance of the transmission channel does not support the digital transmission, the digital transmission will transmit through the channel in a degraded fashion that may result in no video output at the corresponding STB.

Generally, the United States Federal Communication Commission ("FCC") recommends that analog channels be transmitted at 0 dBmV power level at the TV set in order to produce high quality video signals. However, most cable providers currently transmit digital transmissions at lower power levels because digital transmissions are more robust.

Presently, many cable providers that transmit digital cable signals utilize quadrature amplification modulation ("QAM") modulation schemes. Multi-level QAM modulation schemes are well known to those skilled in the art. Typically most cable providers that transmit digital cable signals utilize 64 QAM and 256 QAM modulation schemes and many cable providers are considering transmitting digital cable signals at 1024 QAM.

Unfortunately, digital modulation schemes only operate over channels that have good enough transmission performance capable of supporting the given digital modulation scheme. The higher the digital modulation scheme the higher the needed performance of the channel.

The coaxial cable distribution to a building is controlled by the cable company and typically conforms to well-defined criteria. The in-home cable distribution is typically provided by the homebuilder and is not well controlled, thus possibly resulting in a wide variation in reception. In a typical building 102 the performance of the coaxial cable depends on the coaxial cable distribution 110 and the performance of the building cable wiring in the broadband cable network 100. The measurement of the total signal performance is represented by the output power received at each node (not shown) connecting the broadband cable network 100 at the different CPEs (such as CPEs 120, 122 and 124). Typically, the output power at each node experiences a large amount of power variance from node to node that may be a result of the splitters and cables within the broadband cable network 100.

If the output power level at any node is below the needed power level to support the digital modulation scheme transmitted by the cable provider, the cable provider will have to remediate to ensure adequate performance. Usually, the output power level is measured as a signal metric such as the signal-to-noise ratio ("SNR" or "S/N") of the received signal at the CPE attached at the node, or the received power level P.

As an example, in most cable set-top boxes ("STB") used as a CPE, a 64 QAM modulation scheme typically requires about 23 to 24 dBmV SNR to operate. Similarly, 256 QAM requires about 30 to 32 dBmV and 1024 QAM requires about 36 to 38 dBmV.

If the SNR is not high enough to support the transmitted digital signal then the cable provider must remediate by means that include either amplifying the transmitted signal at the POE 204 or elsewhere, running new cable from the POE 204 to the node having the problem, or transmitting a lower order digital modulation scheme. Unfortunately, infrastructure remediation is difficult, time consuming, labor intensive and expensive.

As a result, many cable providers find it difficult to transmit higher than 64 or 256 QAM signals even though much of the cable plant might be able to support higher constellations. Unfortunately, the lower modulation scheme results in cable providers utilizing the cable bandwidth less efficiently. This results in a lower number of options for special unicast services such as cable modem applications and video on demand ("VoD") services.

With the advent of cable modems and VoD, more and more end users are demanding these services. Cable providers, however, only have limited bandwidth to with which to operate.

Therefore, there is a need for a system and method to reduce the bandwidth limitations of the existing cable network for unicast applications such as cable modem and VoD transmission. Additionally, there is a need for a system and method to vary the digital modulation scheme for transmitting to each CPE in a cable network in order to optimize the cable provider's bandwidth.

SUMMARY

A system is described that consists of a variable modulation unicast system that utilizes multiple modulation schemes in a cable network for unicast applications and is capable of assigning users to different channels of differing modulation schemes in the network. As an example of operation, the variable modulation unicast system transmits a first signal to at least one remote device of a plurality of remote devices, receives a feedback signal from the at least one remote device in response to the transmitted probe signal, and determines the modulation scheme in response to the feedback signal. The variable modulation unicast system may also, in response to the feedback signal, assign a channel from a plurality of channels having differing carrier frequencies and modulation schemes, to a remote device in the network. As another example of operation, the variable modulation unicast system may also receive a feedback signal from at least one remote device of a plurality of remote devices that includes a direct request or a direct command for a specific modulation scheme, and then assign a channel having that modulation scheme to that at least one remote device. The variable modulation unicast system is also capable of modifying the carrier frequencies of the channels.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
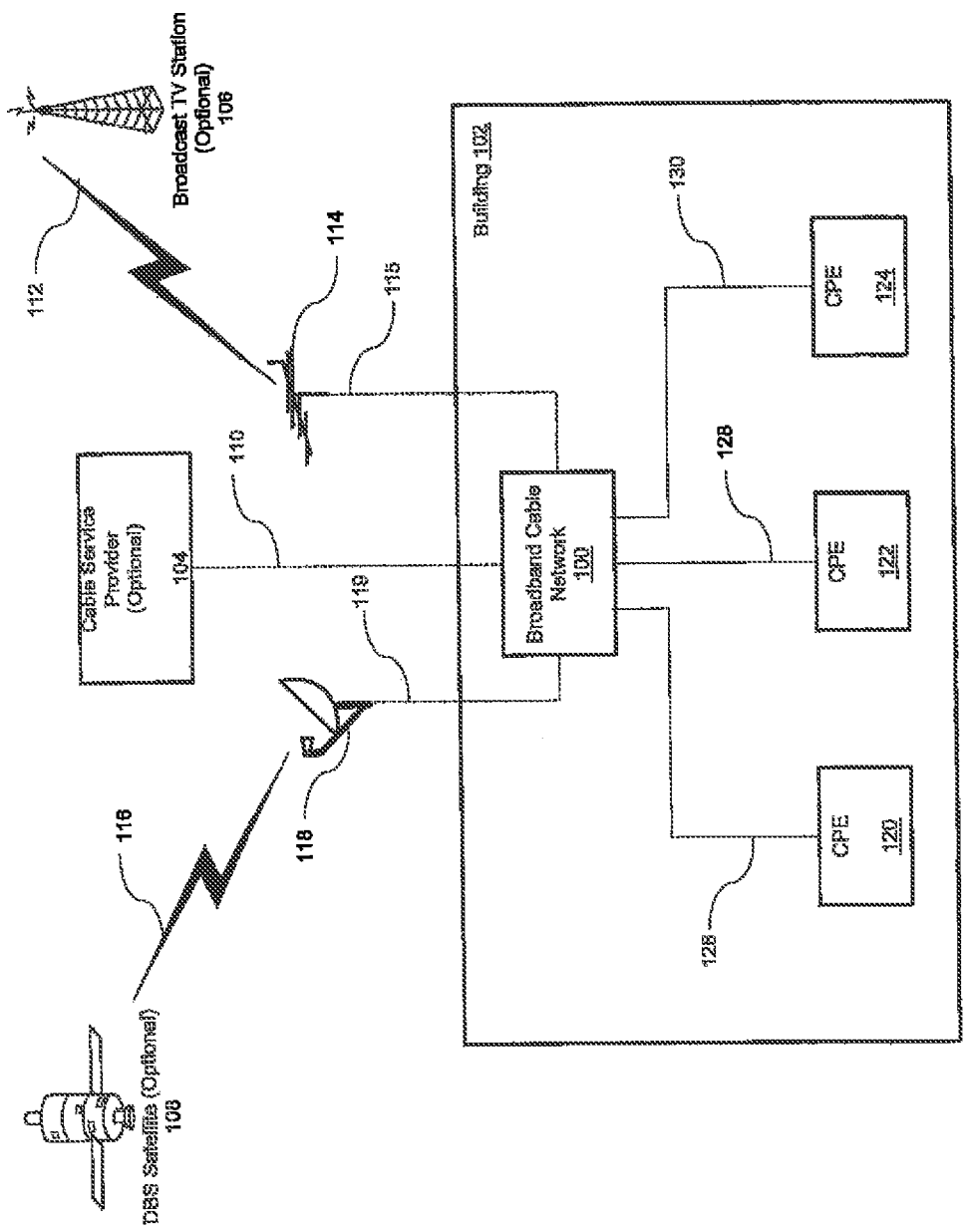
FIG. 1 is a block diagram of an example of an implementation of a known broadband cable network within a building.
Figure 2:
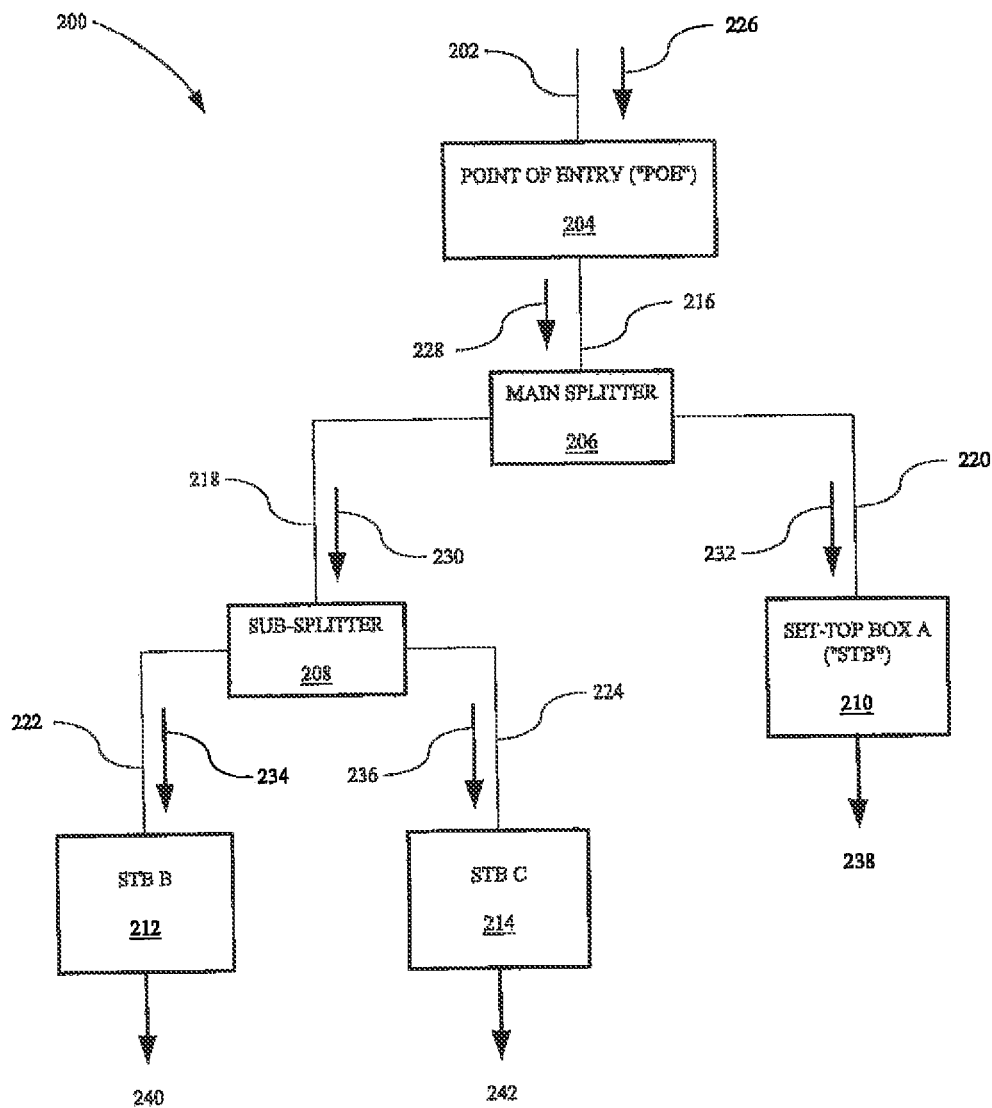
FIG. 2 is a block diagram of another example of an implementation of a known broadband cable network within the building shown in FIG. 1.
Figure 3:
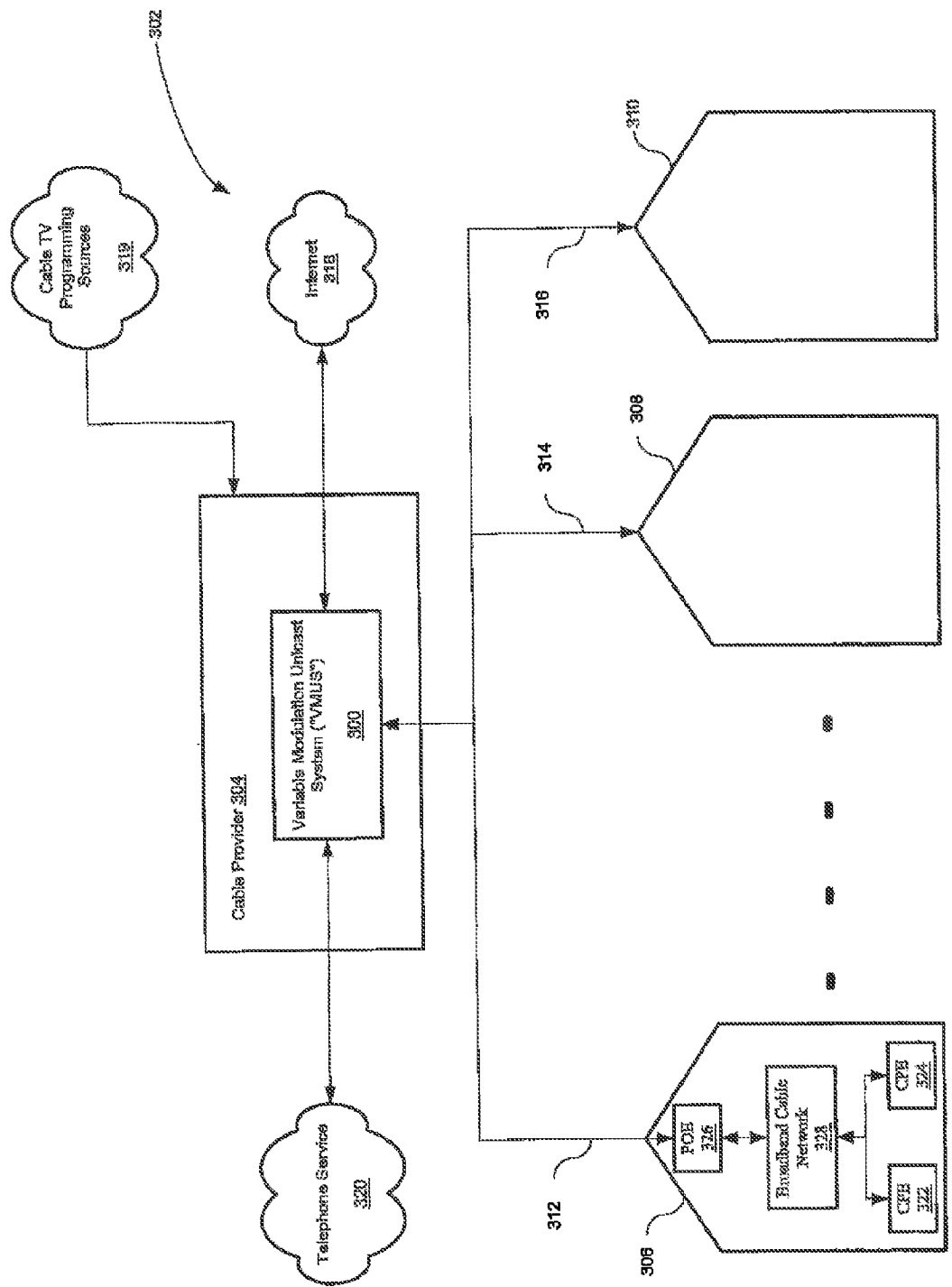
FIG. 3 is a block diagram of an example of an implementation of a variable modulation unicast system within a cable network in accordance with the present invention.

FIG. 3 is a block diagram of an example of an implementation of a variable modulation unicast system ("VMUS") 300 within a cable network 302 in accordance with the present invention. The cable network 302 may also include a cable provider 304 and a plurality of customer premises ("CPs") 306, 308 and 310 where each CP 306, 308 and 310 may be a building such as a multi-dwelling unit or a home. It is appreciated that while only three CPs 306, 308 and 310 are shown, the cable network 302 may include any number of CPs. Each CP may be in signal communication with the VMUS 300 via signal paths 312, 314 and 316, respectively. Additionally, the cable provider 304 also may be in signal communication with the Internet 318 and the telephone system and cable TV programming sources 319.

As an example, CP 306 may be a home with two remote devices receiving cable television programming from the cable provider 304. Examples of the two remote devices may be two customer premises equipment ("CPEs") 322 and 324. In this example, CP 306 may include a point-of-entry ("POE") 326, a broadband cable network 328 and the two CPEs 322 and 324. The CPEs 308 and 310 may include, for example, set-top converter boxes ("STBs") for converting the received cable signals into video signals, cable-ready televisions, cable telephones, video monitors, video game consoles, cable-ready components and appliances and cable modems.

Again, it is appreciated that while only two remote devices (CPEs 322 and 324) are shown, the CP 306 may include any number of remote devices. As an example, many people today have numerous televisions sets in their homes and many also have cable modems for connecting to the Internet 318 as well as cable telephones for connecting to the telephone system 320 via the cable network 302. Additionally, numerous CPs (including CPs 308 and 310) may also have numerous remote devices that may be similar to CPE 322 and CPE 324.

The POE 326 may be any connection, coupler, switch, filter and/or relay that is capable of connecting the signal path 312 from the cable provider 304 to the broadband cable network 328. The broadband cable network 328 may include a plurality of broadband cables (not shown) and broadband cable splitters (not shown). These broadband cables and broadband cable splitters may be implemented utilizing coaxial cables and coaxial cable splitters, respectively. Additionally, the broadband cable splitters may distribute downstream signals from the POE 326 to various terminals (also known as "nodes") in the building. The nodes (not shown) are connected to CPEs 322 and 324. Also, the broadband cable network 328, in addition to coaxial cables and splitters, may include additional passive and active devices such as bi-directional and/or uni-directional amplifiers, filters, diplexers and other RF components and subsystems.

As an example of operation, the VMUS 300 may be utilized to reduce the bandwidth limitations of the cable network 302 for unicast applications such as cable modem and video-on-demand ("VoD") transmission to the remote devices (such as CPE 322 and CPE 324) on the cable network 302. In general, the VMUS 300 reduces the bandwidth limitation of the cable network 302 by varying the digital modulation schemes utilized for transmitting to each remote device in the cable network 302 in order to optimize the bandwidth of the cable network 302.

In operation, the VMUS 300 may transmit a first signal to at least one remote device from a plurality of remote devices, where the first signal utilizes a first modulation scheme. The VMUS 300 may then receive a feedback signal from the remote device, where the feedback signal may include identification information for the remote device and a first metric value representative of the transmission characteristics of a channel-path to the remote device. In response to the received feedback signal, the VMUS 300 may determine a second modulation scheme that it may utilize to transmit a second signal to the remote device. The VMUS 300 may also assign a home-channel, having a home-channel frequency, to the remote device in response to the received first metric value and identification information for the remote device. The VMUS 300 may then transmit the second signal to the remote device utilizing the home-channel.

An example of an architecture for the VMUS 300 may include a transmitter (not shown) capable of transmitting a first signal to at least one remote device, where the first signal utilizes a first modulation scheme. The VMUS 300 may also include a receiver (not shown) capable of receiving a feedback signal from the remote device in response to the transmitted first signal, where the feedback signal includes identification information for the remote device and a first metric value representative of the transmission characteristics of a channel-path to the remote device. The VMUS 300 may further include a controller (not shown) capable of determining a second modulation scheme in response to the received first metric signal and instructing the transmitter to transmit a second signal to the remote device, where the second signal utilizes the second modulation scheme.

Figure 4:
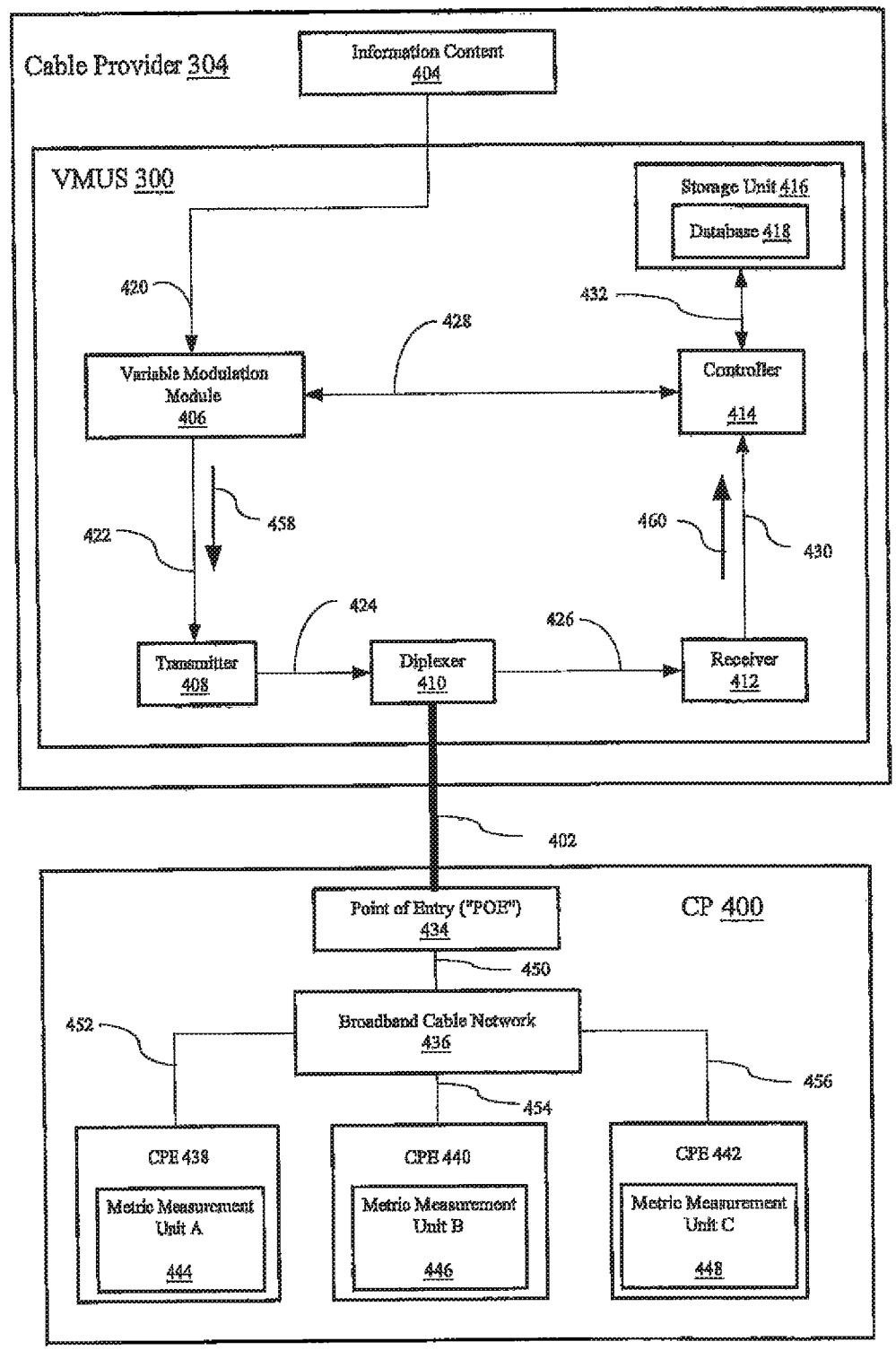
FIG. 4 is a block diagram of an example of an implementation of the variable modulation unicast system shown in FIG. 3.

In FIG. 4, a block diagram of the VMUS 300 is shown in signal communication with the CP 400 via signal path 402. The VMUS 300 is located at a premises of the cable provider 304 and may be in signal communication with information content 404 provided by the cable provider 304 to the CP 400. As an example of an implementation of the architecture, the VMUS 300 may include a variable modulation module 406, transmitter 408, diplexer 410, receiver 412, controller 414 and storage unit 416 having a database 418. The variable modulation module 406 may be in signal communication with the information content 404 and transmitter 408 via signal paths 420 and 422, respectively. The diplexer 410 may be in signal communication with transmitter 408 and receiver 412 via signal paths 424 and 426, respectively. The controller 414 may be in signal communication with the variable modulation module 406, receiver 412 and storage unit 416 via signal paths 428, 430 and 432, respectively.

The CP 400 may include POE 434, broadband cable network 436 and remote devices CPE 438, CPE 440 and CPE 442. The CPE 438 may include a metric measurement unit A 444, CPE 440 metric measurement unit B 446, and CPE 442 metric measurement unit C 448. The broadband cable network 436 is in signal communication with POE 434, CPE 438, CPE 440 and CPE 442 via signal paths 450, 452, 454 and 456, respectively. Again, it is appreciated that while only three CPEs 438, 440 and 442 are shown, CP 400 may include any number of CPEs. The CPEs 438, 440 and 442 may include, for example, STBs, cable-ready televisions, cable telephones, video monitors, video game consoles, cable-ready components and appliances and cable modems.

The POE 434 may be any connection, coupler, switch, filter and/or relay that is capable of connecting the signal path 402 from the cable provider 304 to the broadband cable network 436. The broadband cable network 436 may include a plurality of broadband cables (not shown), broadband cable splitters (not shown), and unidirectional or bidirectional amplifiers (not shown) or other devices. These broadband cables and broadband cable splitters may be implemented utilizing coaxial cables and coaxial cable splitters, respectively. Additionally, the broadband cable splitters may distribute downstream signals from the POE 434 to CPEs 438, 440 and 442 through the signal paths 452, 454 and 456, respectively, and may distribute upstream signals from CPEs 438, 440 and 442 through the signal paths 452, 454, and 456, respectively.

The variable modulation module 406 is capable of transmitting QAM (i.e., Quadrature Amplitude Modulation) signals over multiple channels at different modulations and of switching the modulation scheme utilized by each channel in modulating the information content 404 based on the instructions from the controller 414 via signal path 428. The VMUS 300, utilizing instructions from the controller 414 via signal path 428 to the variable modulation module 406, is also capable of switching content from one modulated channel at one frequency to another modulated channel (with similar or different modulation and/or modulation scheme) at a different frequency. Examples of variable modulation module 406 include the Motorola® SmartStream Encryptor Modulator (SEM) and the Scientific-Atlanta® Model D9476 16/64/128/256 Modulator (for broadcast).

The transmitter 408 may be a standard cable-type headend transmitter that is well known to those skilled in the art. The transmitter 408 is capable of transmitting the modulated signal 458 produced by the variable modulator module 406 to CP 400. An example of transmitter 408 is the Motorola® Commander 8 (CM8) upconverter.

The receiver 412 may be the standard cable type upstream receiver at the cable provider 304 capable of receiving control signals from the remote devices (such as CPEs 438, 440 and 442), and can be a DOCSIS or an out-of-band (OOB) receiver utilized for receiving cable modem return channel or STB return channel information. Examples of receiver 412 include the Motorola® Omnistar® Dual Return Path Receiver and the Scientific-Atlanta® Atlas Mk II—Digital Terrestrial Receiver. The receiver 412 may receive control signals from the remote devices and pass the control information 460 to the controller 414 via signal path 430. The diplexer 410 may be any standard diplexer capable of allowing the transmitter 408 to transmit signals to CP 400, via signal paths 424 and 402, while also allowing the receiver 412 to receive control signals from CP 400 via signal paths 402 and 426. The transmitter 408 and the receiver may comprise a single unit (for example, the Scientific-Atlanta® Prisma GbE™ Optical Transmitter/Receiver/Transceiver). Also, the variable modulation module 406 and the transmitter 408 may comprise a single unit (for example, the Scientific-Atlanta® Continuum DVP™ Dense QAM Array [for Voice-on-Demand delivery]).

The controller 414 may be any processor, microprocessor, and/or microcontroller type of device capable of controlling the modulation scheme produced by the variable modulation module 406. Examples of the controller 414 include the Motorola® NC 1500 Network Controller and the Scientific-Atlanta® C-100 Multiplexer Controller. The controller 414 may be in signal communication with the storage unit 416 for storing data relating to the feedback signals received from the remote devices. The storage unit 416 may include a memory unit such as a flash non-volatile memory, read-access memory ("RAM") or any other type of memory storage device. The storage unit 416 may also include a database 418 stored within the memory unit for storing the control-related information from the remote devices.

The metric measurement unit A 444, metric measurement unit B 446 and metric measurement unit C 448 may be any measurement device capable of measuring signal metric values at the remote devices CPE 438, 440 and 442, respectively. Examples of the metric values may include the signal-to-noise ratio (also known as the "SNR" and "S/N"), the bit-error rate ("BER"), the packet error rate ("PER"), and the power level and any other similar measurement of the received signal at the corresponding remote device. However, other signal-performance metric values are also possible without departing from the scope of the invention.

The metric values measured by the metric measurement unit A 444, metric measurement unit B 446 and metric measurement unit C 448 or a representative metric value derived from a plurality of such metric values, may be selectively transmitted to the VMUS 300 by way of the feedback signal in order to determine the signal performance of the received signals from the VMUS 300 at the remote devices. As an alternative to a metric value or a representative metric value, the feedback signal may include a direct request or a direct command from the corresponding CPE (438, 440 or 442) to the controller 414 to send future information to the CPE (438, 440 or 442) at a given modulation scheme, such as 64, 256 or 1024 QAM. In this case, the CPE itself utilizes the metric information to compute a corresponding modulation scheme and informs the controller 414 about the desired modulation together with the identity of the sending CPE. The controller 414 receives the information through the receiver 412, verifies that an appropriate carrier with the appropriate modulation scheme is available, informs the CPE (438, 440, 442) about the transition and then sends all future unicast information to the CPE (438, 440, 442) over the new modulation scheme.

In operation, the VMUS 300 transmits a first signal to the plurality of remote devices that include CPE 438, CPE 440, CPE 442 and others. The first signal may be modulated utilizing a first modulation scheme produced by the variable modulation module 406 and transmitted on one channel. The VMUS 300 may transmit the first signal utilizing a known-channel where the known-channel has a known-channel carrier frequency. The known-channel may then function as a "log-on-channel" that allows the remote devices to tune to and receive the known-channel and access (i.e., "log-on" to) the cable provider 304.

As an example of a remote device, CPE 438 may receive the transmitted first signal and in response determine the metric value of the received first signal with metric measurement unit A 444. The metric value may be a measure of the transmission characteristics of the channel-path from the VMUS 300 to CPE 438 where the channel-path would include the transmission path through the transmission line (such as a coaxial cable) along signal path 402, POE 434, the transmission line along signal path 450, broadband cable network 436 and the transmission line along signal path 452. If the characteristics of the transmission line along signal path 402 are known, the metric value may also be a measure of the transmission characteristics of the channel-path from the POE 434 to the CPE 438.

In this example, the representative metric value may be derived from measured values that may include the measured SNR and/or the BER and/or the PER and/or the power level of the received first signal at CPE 438. CPE 438 may then produce a feedback signal that includes the representative metric value and some type of identification information for CPE 438. In the case of CPE 438 being a cable modem, the identification information may also include the Internet Protocol ("IP") address for the CPE 438. CPE 438 then transmits the feedback signal to the VMUS 300 through signal path 452, broadband cable network 436, signal path 450, POE 434 and signal path 402. In the case of CPE 438 being a cable modem, the feedback signal may be transmitted to the VMUS 300 utilizing a control-channel defined by Data Over Cable Service Interface Specifications ("DOCSIS"). The CPE can also send back the information over the out-of-band (OOB) return channel, which is currently being utilized by cable STBs to send information back for VOD and other control functions.

The VMUS 300 receives the feedback signal with receiver 412 and produces the control information signal 460 that includes the representative metric value and identification information from the received feedback signal. The control information signal 460 is passed to the controller 414 and the controller 414 in response may determine a second modulation scheme that is better suited for unicast type transmissions to CPE 438. The controller 414 may utilize a threshold detector (not shown) to determine the second modulation scheme. If the controller 414 determines that another modulation scheme should be utilized in unicast transmissions to CPE 438, the controller 414 instructs the variable modulation module 406 to switch to another modulation scheme on a second channel when transmitting unicast services to CPE 406. The VMUS may also determine that the carrier frequency of a channel should be changed to accommodate the requirements of the system; that is, if another channel is required for the second modulation scheme, the controller 414 may instruct the variable modulation module 406 to assign a different carrier frequency to a channel, and then that channel would be used to transmit unicast services to CPE 406.

The controller 414 then stores in storage unit 416 (via signal path 432) the identification information, the representative metric value and the selected modulation scheme for CPE 438. The VMUS 300 then transmits a second signal to CPE 438 where the second signal utilizes a second modulation scheme. The second modulation scheme corresponds to the selected modulation scheme from the controller 414 and the second signal may be transmitted utilizing a new home-channel that has a home-channel carrier frequency different than the known-channel carrier frequency. In this example, CPE 438 would then potentially be able to tune to the new home-channel and receive unicast services at a different modulation scheme. Once CPE 438 tunes to the new home-channel, CPE 438 may again measure the transmission characteristics of the home-channel and send back a new feedback signal with metric values associated with the new home-channel. This allows the VMUS to again change the selected modulation scheme in response to a change in the transmission characteristics of the new home-channel.

As an example, if CPE 438 is capable of receiving signals from the VMUS 300 at 1024 QAM and CPE 440 is capable of receiving signals at 256 QAM but some other remote devices on the cable network 302 are only capable of receiving signals from the VMUS 300 at 64 QAM, the cable provider 304 typically will only transmit broadcast signals (i.e., signals transmitted to all remote devices) at 64 QAM to ensure that all remote devices receive the broadcast signals. However, the VMUS 300 allows transmission on a unicast basis to both CPE 438 and CPE 440 at modulation schemes higher than 64 QAM. These unicast transmissions may include unicast services associated with either cable modem DOCSIS services or VoD. In this example, the VMUS 300 would transmit unicast services to CPE 438 at 1024 QAM while at the same time transmitting unicast services to CPE 440 at 256 QAM and 64 QAM to other remote devices.

The VMUS 300 may receive a plurality of feedback signals from the plurality of remote devices and store the received metric values or representative metric values, as the case may be, and identification information for each remote device in the storage unit 416. This stored information may be organized in a database 418 and this database 418 may be utilized by the VMUS 300 to adaptively adjust the unicast channel distribution of transmitted channels to the remote devices as needed.

Figure 5:
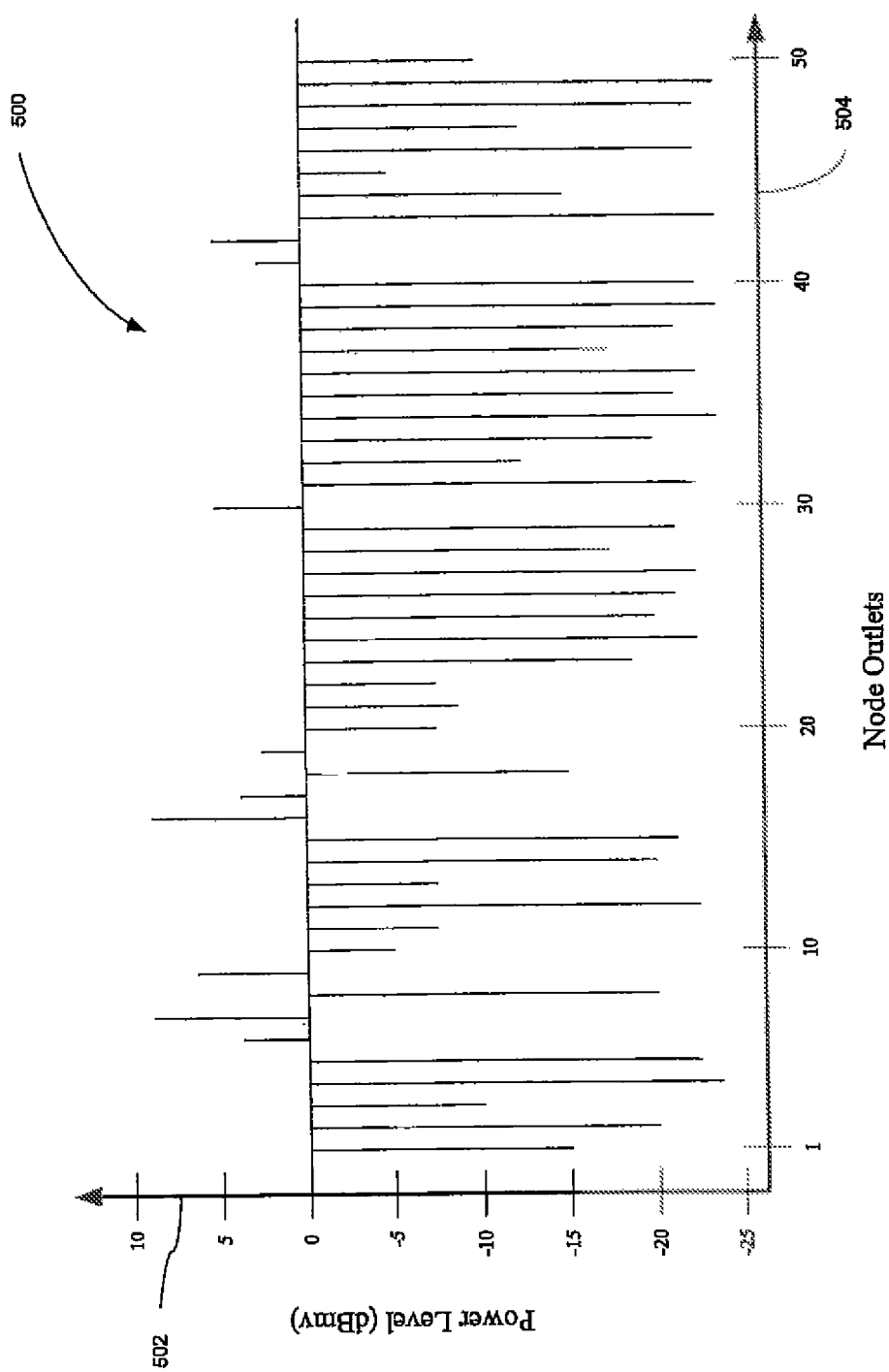
FIG. 5 is a graph of an example of a plot of the power level versus node output for each receiving node in a cable network similar to the one shown in FIG. 3.

FIG. 5 is a graph of an example of a plot 500 of the measured power level 502 in dBmV versus node number 504 for each receiving node (not shown) connected to a remote device in several cable networks similar to the one shown in 302. This graph is a summary of real cable system measurements. Typically, if the remote device is a digital STB, the noise figure of the remote device is approximately 8 dBmV, which results in approximately −49.6 dBmV noise floor for a 6 MHz cable channel. It is appreciated by those skilled in the art, that the −49.6 dBmV is calculated by taking the thermal noise in combination with the noise figure of 8 dBmV and a channel bandwidth of 6 MHz and a typical room temperature using a standard calculation. Also, for simplicity, the noise floor power level may be rounded to −50 dBmV without affecting the basics of the presented analysis.

As a result, in order to calculate the approximate SNR at a remote device the power received at the remote device is subtracted by −50 dBmV. As an example, if the power received at the remote device is −20 dBmV the resulting SNR would be 30 dBmV by subtracting the noise floor power from the signal power.

In order to receive 64 QAM at a remote device, the remote device typically needs the received signals to have about 23 to 24 dBmV of SNR. In order to receive 256 QAM, the received signals should have about 29 to 30 dBmV of SNR, and 36 to 38 dBmV of SNR is typically needed for 1024 QAM.

Figure 6:
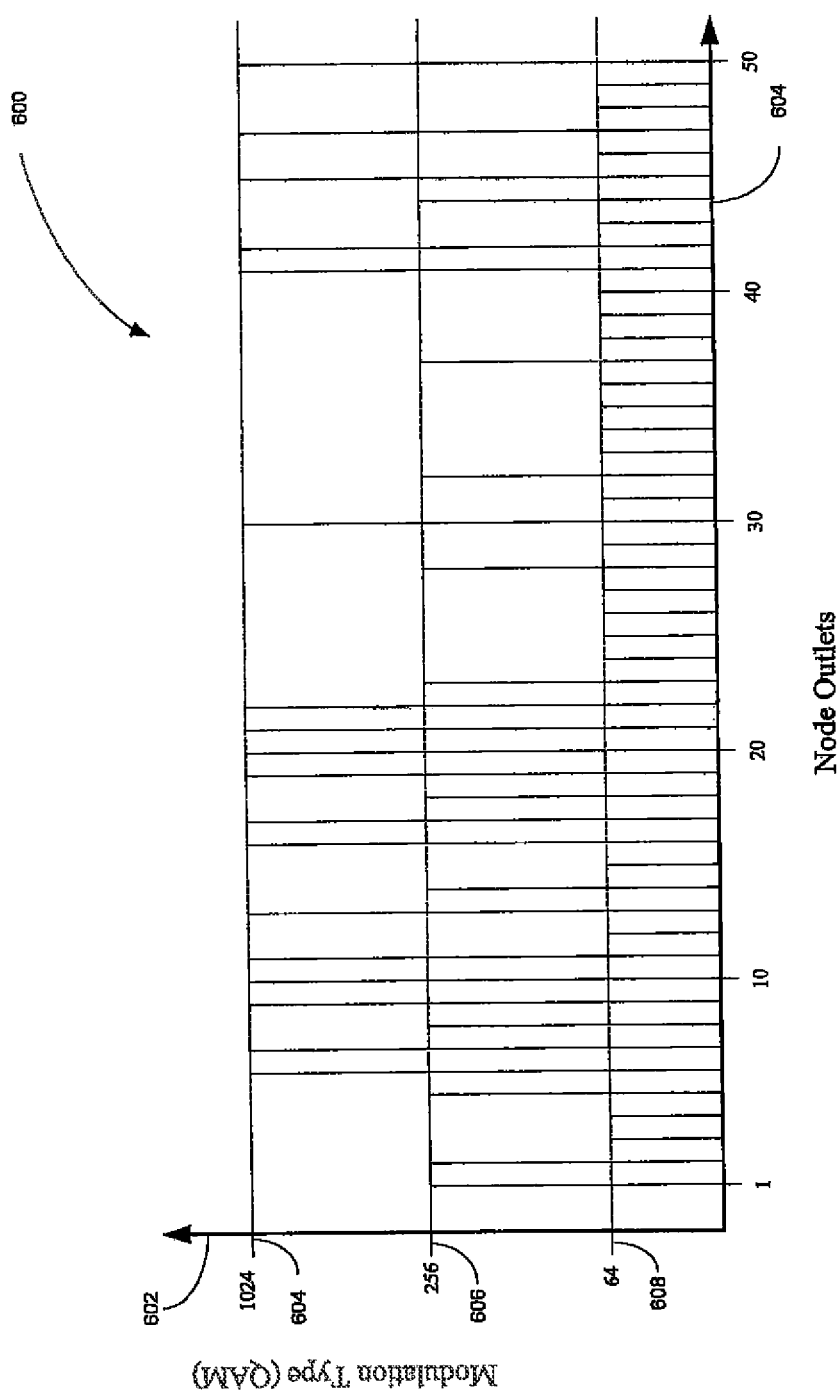
FIG. 6 is a graph of an example of a plot of the modulation scheme type versus node output for each receiving node in the cable network shown in FIG. 3 corresponding to the power levels shown in the plot of FIG. 4.

In FIG. 6 a graph of an example of a plot 600 of the modulation scheme type (QAM) 602 versus node number 604 for each remote device connected to a receiving node in the cable network 302 is shown. The modulation scheme type 602 values for each node number correspond to the power levels 502 shown in the plot 500, FIG. 5.

The modulation scheme types are shown as having three threshold values at 1024 QAM 604, 256 QAM 606 and 64 QAM 608. The 1024 QAM threshold 604 corresponds to signals having at least −12 dBmV of measured power level at the remote device, the 256 QAM threshold 606 corresponds to signals having at least −20 dBmV of measured power level at the remote device, and the 64 QAM threshold 606 corresponds to signals having between −20 dBmV and −26 dBmV of measured power level at the remote device. The controller 414, FIG. 4, or each of the CPEs (438, 440, 442) may utilize these threshold values to determine proper modulation schemes to transmit to particular remote device.

Figure 7:
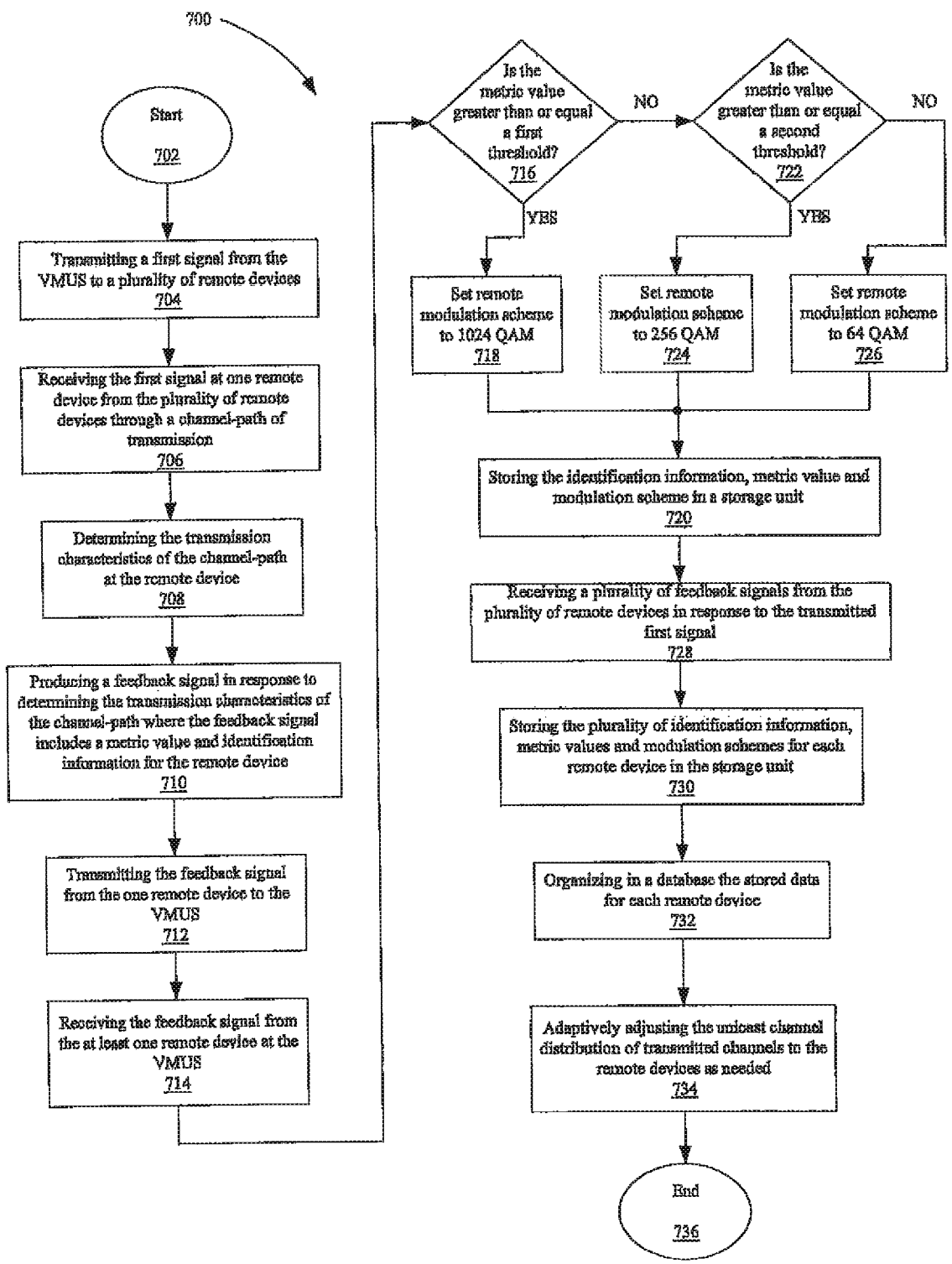
FIG. 7 is a flowchart illustrating an example of a method performed by the variable modulation unicast system shown in FIG. 3.

FIG. 7 is a flowchart 700 illustrating an example of a method performed by the VMUS 300. The process starts in step 702 and in step 704, the VMUS 300 transmits a first signal to the plurality of remote devices. In step 706, a remote device receives the first signal through a channel-path of transmission and, in step 708, the remote device determines the transmission characteristics of the channel-path by measuring the characteristics of the received first signal at the remote device. In step 710, the remote device produces a feedback signal in response to determining the transmission characteristics of the channel-path where the feedback signal includes a metric value and identification information for the remote device. The remote device then transmits the feedback signal to the VMUS 300, in step 712, and the VMUS receives the feedback signal in step 714. The controller 414 then receives the metric value from the feedback signal and determines the modulation scheme to utilize with the remote device for unicast transmissions.

As an example, if the VMUS 300 operates utilizing the three modulation schemes of 1024 QAM, 256 QAM and 64 QAM, the controller 414 may utilize a threshold detector to determine the proper modulation scheme to use based on the value of the received metric value from the remote device. Assuming in this example that the remote device needs the received signals at the remote device to have about 36 to 38 dBmV of SNR in order to receive 1024 QAM, the controller 414 may utilize a first threshold having a value of approximately 40 dBmV. Similarly, if the remote device needs the received signals at the remote device to have about 30 dBmV of SNR in order to receive 256 QAM, the controller 414 may utilize a first threshold having a value of approximately 32 dBmV. If the received signals have less than 32 dBmV the VMUS 300 may default to transmitting at 64 QAM.

As a result, in decision step 716, if the received metric value is greater than or equal to the first threshold (such as 40 dBmV of SNR), the process continues to step 718 where the VMUS 300 sets the modulation scheme to 1024 QAM and the process continues to step 720. If instead, in decision step 716, the received metric value is less than the first threshold, the process continues instead to decision step 722.

In decision step 722, if the metric value is greater than or equal to a second threshold (such as 32 dBmV), the process continues to step 724 where the VMUS 300 sets the modulation scheme to 256 QAM and the process continues to step 720. If instead, in decision step 722, the received metric value is less than the second threshold, the process continues instead to step 726 where the VMUS 300 sets the modulation scheme to 64 QAM and the process again continues to step 720.

In step 720, the VMUS 300 stores the identification information, metric value and modulation scheme in a storage unit 416 and, in step 728, the VMUS 300 receives a plurality of feedback signals from the plurality of remote devices in response to the transmitted first signal. The VMUS 300 then stores the plurality of identification information, metric values and modulation schemes for each remote device in the storage unit 730 and, in step 732, the VMUS 300 organizes the stored data for each remote device in a database. Finally, the VMUS 300 adaptively adjusts the unicast channel distribution of the transmitted channels to the remote devices as needed based on the database in step 734. The process ends in step 736. Also, the threshold values in 716 and 816 and also in 722 and 822 can have different values at different times. For example, the process may start with an initial threshold for each of the modulation schemes, such as 40 dBmV for 1024 QAM and 32 dBmV for 256 QAM. Once a CPE modulation has been adjusted, a decision on a new threshold may be made in such a way as to prevent frequent switching from occurring. For example, if the original threshold for using 1024 QAM requires SNR greater than 40 dBmV, then switching back to 256 QAM may not occur until the SNR drops below 38 dBmV. This prevents a frequent switching back and forth if the real SNR is just around 40 dBmV and fluctuates slightly due to differences in measurements or very small differences in channel conditions. This concept also applies for all other thresholds in FIG. 7. and FIG. 8.

Figure 8:
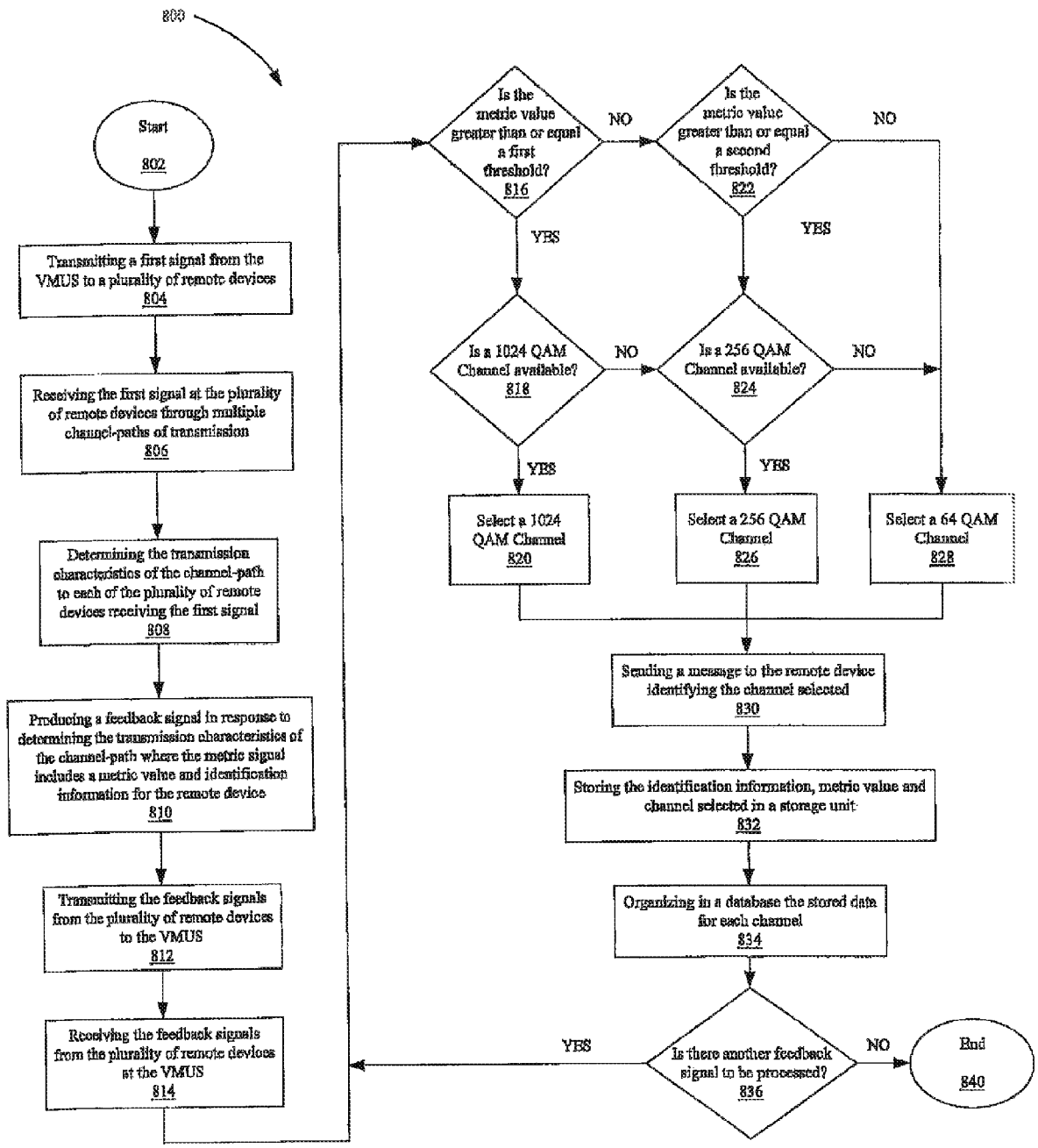
FIG. 8 is a flowchart illustrating another example of a method performed by the variable modulation unicast system.

FIG. 8 is a flowchart 800 illustrating another example of a method performed by the VMUS 300. The process starts in step 802 and in step 804, the VMUS 300 broadcasts a first signal to the plurality of remote devices. In step 806, a plurality of remote devices receives the first signal through their respective channel-paths of transmission and, in step 808, each remote device determines the transmission characteristics of their respective channel-paths by measuring the characteristics of the received first signal at the remote device. In step 810, each remote device produces a feedback signal in response to determining the transmission characteristics of their respective channel-paths where the feedback signal includes a metric value and identification information for the remote device. The remote devices then transmit the feedback signals to the VMUS 300, in step 812, and the VMUS receives the feedback signal in step 814. As in FIG. 7, the controller 414 then receives the metric value from the feedback signal and determines the modulation scheme to utilize with a particular remote device for unicast transmissions.

Using the same example as in FIG. 7, if the VMUS 300 operates utilizing the three modulation schemes of 1024 QAM, 256 QAM and 64 QAM, the controller 414 may utilize a threshold detector to determine the proper modulation scheme to use based on the value of the received metric value from the remote device. Assuming again that the remote device needs the received signals at the remote device to have about 38 dBmV of SNR in order to receive 1024 QAM, the controller 414 may utilize a first threshold having a value of approximately 40 dBmV. Similarly, if the remote device needs the received signals at the remote device to have about 30 dBmV of SNR in order to receive 256 QAM, the controller 414 may utilize a first threshold having a value of approximately 32 dBmV. If the received signals have less than 32 dBmV the VMUS 300 may default to transmitting at 64 QAM.

As a result, in decision step 816, if the received metric value is greater than or equal to the first threshold (such as 40 dBmV of SNR), the process continues to decision step 818. If the received metric value is less than the first threshold, the process continues to decision step 822. In decision step 818, the VMUS 300 determines if a 1024 QAM channel is available, and if so, the process continues to step 820 where a 1024 QAM channel is selected. If instead, in decision step 818, there is no 1024 QAM channel available, the process continues instead to decision step 824.

In decision step 822, if the metric value is greater than or equal to a second threshold (such as 32 dBmV of SNR), the process continues to decision step 824. If the received metric value is less than the first threshold, the process continues to step 828, where a 64 QAM channel is selected by default. In decision step 824, the VMUS 300 determines if a 256 QAM channel is available, and if so, the process continues to step 826 where a 256 QAM channel is selected. If instead, in decision step 824 there is no 256 QAM channel available, the process continues to step 828, where a 64 QAM channel is selected by default.

In step 830, the VMUS sends a message to the remote device that identifies the channel selected by the VMUS 330 in decision steps 818, 826, or 828 for that channel. In step 832, the VMUS 300 stores the identification information, metric value and channel selected in storage unit 416. In step 732, the VMUS 300 organizes the stored data for each remote device and channel in a database. Finally, the VMUS 300, in decision step 836, determines if there is another feedback signal to be processed, and if so, the process repeats itself by going to decision step 816. Otherwise the process ends in step 840.

The processes in FIGS. 7 and 8 may be performed by hardware or software. If the process is performed by software, the software may reside in software memory located on the storage unit 416 or controller 414 in the VMUS 304. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions.

In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, i.e., "a non-exhaustive list" of the computer-readable media, would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

While various embodiments of the invention have been described, it will be apparent to those of ordinary skill in the art that many more embodiments and implementations are possible that are within the scope of this invention.

What is claimed is:

1. A method for a selecting a channel from a plurality of channels for assignment to a remote device in a variable modulation unicast system, the method comprising:
    transmitting a plurality of first signals to a plurality of remote devices over a plurality of channel-paths to the plurality of remote devices, wherein each first signal utilizes a first modulation scheme;
    receiving a plurality of feedback signals from the plurality of remote devices in response to transmitting the first signals, wherein each feedback signal includes identification information for a corresponding remote device of the plurality of remote devices and a first metric value representative of the transmission characteristics of the channel-path to the corresponding remote device;
    assigning a first assigned-channel having an assigned-channel carrier frequency from the plurality of channels to the corresponding remote device in response to the received first metric signal from the corresponding remote device, wherein assigning the first assigned-channel to the corresponding remote device further includes:
        determining the availability of a subplurality of channels from the plurality of channels in response to the statistical information, wherein the availability of the channel is determined in response to the first metric values and identification information related to the corresponding remote devices previously assigned to the subplurality of channels;
        determining a modular scheme compatible with each of the subplurality of channels and the corresponding remote device; and
        selecting a channel from the subplurality of channels; and
    transmitting a second signal to the corresponding remote device, wherein the second signal includes information identifying the first assigned-channel determined in response to the received first metric signal.

2. The method of claim 1, further including:
    storing the first metric value, identification information and first assigned-channel assigned to the corresponding remote device in a storage unit; and
    determining statistical information from the first metric values, identification information and first assigned-channels related to each of the corresponding remote devices.

3. The method of claim 2, wherein the storage unit includes a memory unit.

4. The method of claim 3, wherein the storage unit includes a database.

5. The method of claim 1, further including modifying the carrier frequency of the first assigned-channel in response to the statistical information determined from the first metric values, identification information and assigned-channels related to the corresponding remote devices.

6. The method of claim 1, wherein the first metric value is determined at the corresponding remote device in response to determining the transmission characteristics of the channel-path at the corresponding remote device.

7. The method of claim 6, wherein the first metric value representative of the transmission characteristics of the channel-path at the corresponding remote device is determined by the corresponding remote device.

8. The method of claim 1, wherein transmitting a first signal further includes transmitting the first signal over a known-channel utilizing a known-channel carrier frequency.

9. The method of claim 8, wherein the feedback signal is received on a control-channel utilizing a control-channel frequency.

10. The method of claim 9, wherein the first metric value represents the SNR, the BER, the PER, or the power level of the received first signal at the corresponding remote device.

11. The method of claim 10, wherein the corresponding remote device is a cable modem.

12. The method of claim 11, wherein the cable modem utilizes a Data Over Cable Service Interface Specifications ("DOCSIS") protocol.

13. The method of claim 11, wherein the control-channel utilizes the DOCSIS protocol.

14. The method of claim 10, wherein the corresponding remote device is a Set-Top Box ("STB") capable of receiving Video-on-Demand ("VOD") signals.

15. The method of claim 14, wherein the control-channel utilizes the STB out-of-band (OOB) channel 16. The method of claim 10, wherein the at least one remote device is a Set-Top Box ("STB") capable of receiving VOD signals.

17. The method of claim 8, wherein the identification information includes the Internet Protocol ("IP") address associated with the corresponding remote device.

18. The method of claim 17, wherein transmitting the second signal to the corresponding remote device utilizing the first assigned-channel further includes transmitting all VOD signals and all DOCSIS signals.

* * * * *